Dec. 17, 1935.　　　E. G. BAILEY ET AL　　　2,024,197
PROCESS AND APPARATUS FOR RETURNING FLUE DUST TO A FURNACE
Filed Feb. 26, 1930　　　3 Sheets-Sheet 1

INVENTORS
Ervin G. Bailey
BY Ralph M. Hardgrove
Clifford, Scull & Burger
ATTORNEYS Dec. 17, 1935. E. G. BAILEY ET AL 2,024,197
PROCESS AND APPARATUS FOR RETURNING FLUE DUST TO A FURNACE
Filed Feb. 26, 1930 3 Sheets-Sheet 3

Patented Dec. 17, 1935

2,024,197

UNITED STATES PATENT OFFICE 2,024,197

PROCESS AND APPARATUS FOR RETURNING FLUE DUST TO A FURNACE

Ervin G. Bailey, Easton, and Ralph M. Hardgrove, Bethlehem, Pa., assignors to Fuller Lehigh Company, Fullerton, Pa., a corporation of Delaware Application February 26, 1930, Serial No. 431,385

8 Claims. (Cl. 110—28)

This invention relates to a process and apparatus for collecting flue dust passing out of the furnace with waste gases and returning it to the furnace to burn combustible constituents in the dust and fuse the mineral particles to form slag, thus avoiding the nuisance of having the dust scatter over the surroundings, and also utilizing the combustible constituents in the dust to produce more heat in the furnace.

In carrying out the invention, the dust leaving the furnace is gathered and returned to the floor of the furnace in a pile, preferably at intervals, thus permitting the combustible portions of the dust to burn and the residue to be melted and drawn out of the furnace with the molten slag, when desired. The furnace is provided with water-cooled walls and with a floor upon which molten slag is permitted to collect until it is to be withdrawn through a slag tap hole in the side of the furnace.

Figure 1:
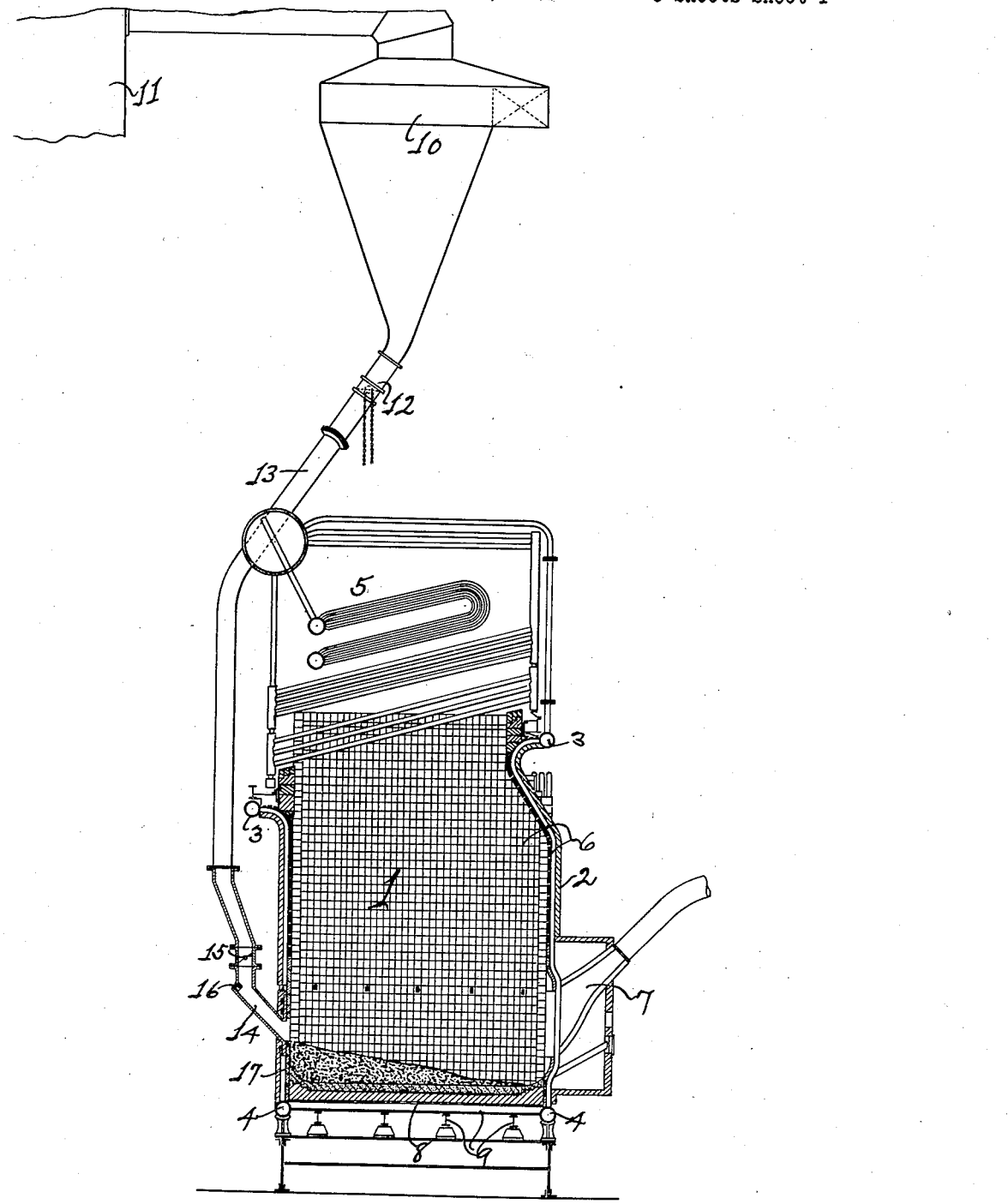
Figure 2:
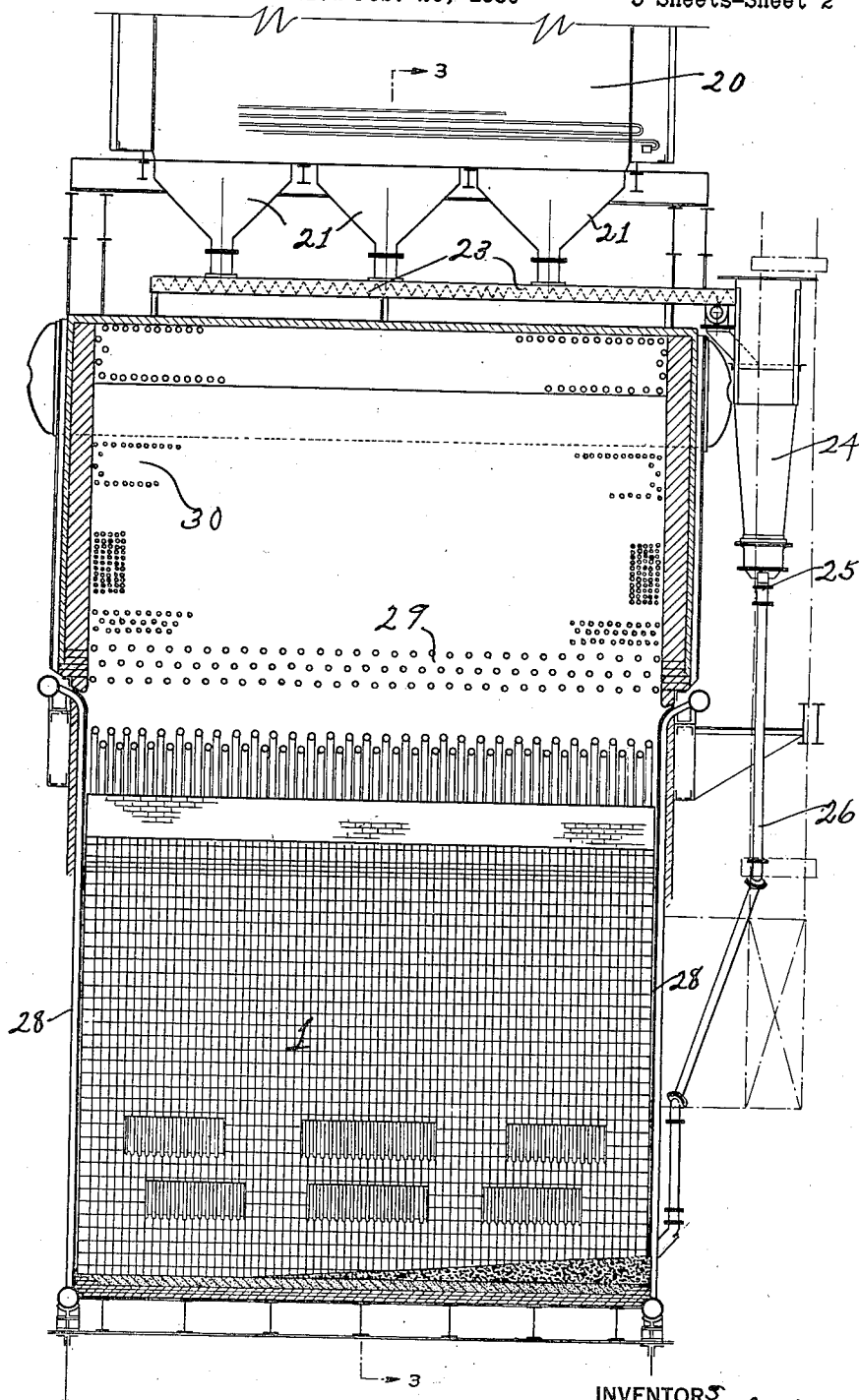
Figure 3:
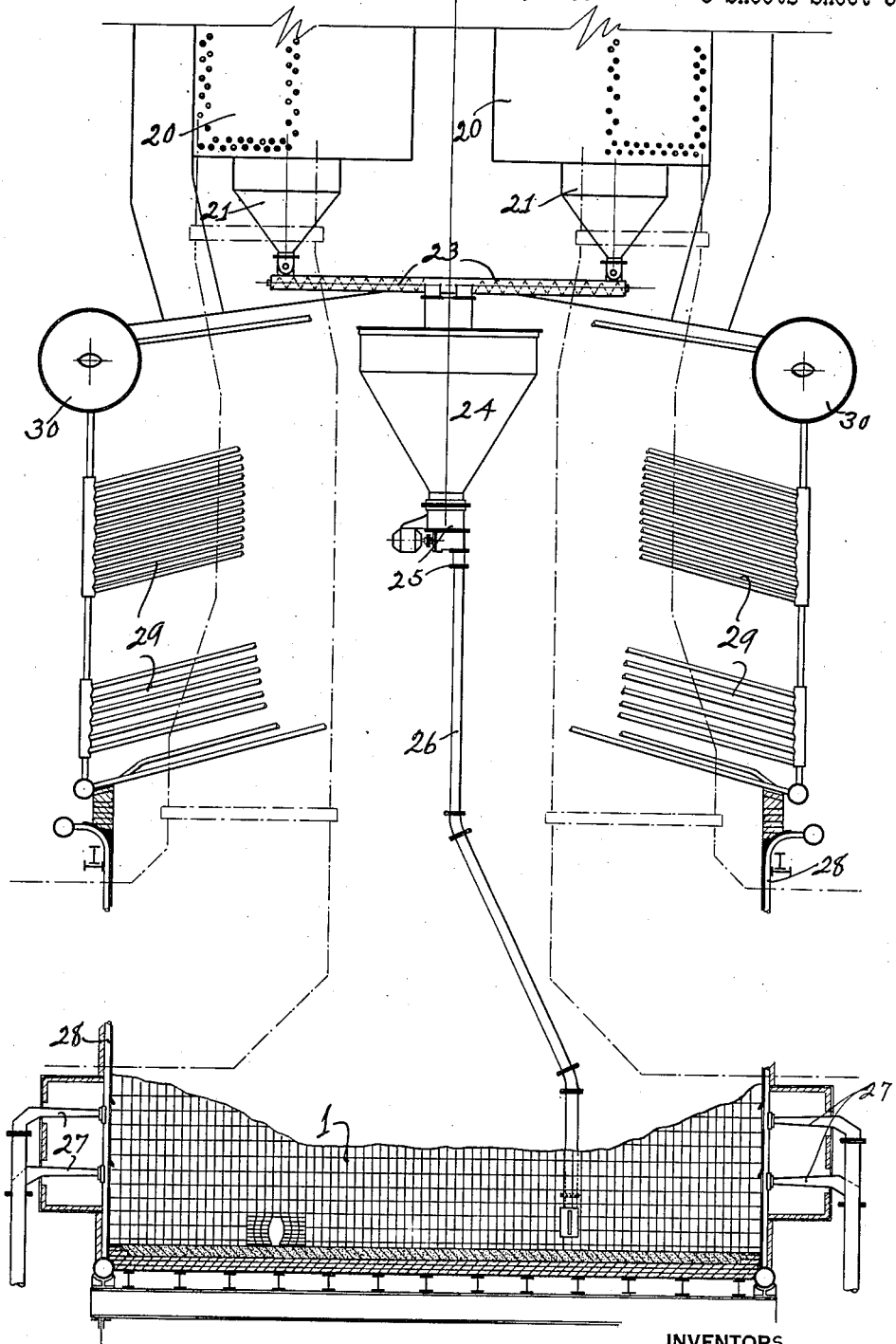

The invention will be understood from the description in connection with the accompanying drawings, in which Fig. 1 is a vertical section through a furnace illustrating an application of the invention; Fig. 2 is a vertical section through another form of furnace showing a modification of the invention, and Fig. 3 is a side elevation, partly in section, along the line 3—3 of Fig. 2.

Reference character 1 indicates a furnace along the walls of which rows of upwardly extending tubes 2 are provided, these tubes being connected to upper headers 3 and lower headers 4, which may be, in turn, connected to the water circulation system of a boiler 5 located above the furnace. The tubes are lined with the well known Bailey blocks 6, thus providing smooth faces along the inside walls of the furnace. One or more fuel burners 7 for powdered fuel, such as powdered coal, for example, are provided for introducing powdered fuel into the furnace, the combustion air being supplied in the usual way. The furnace floor 8 is supported by means of cross supports 9 and is made of refractory material upon which molten slag can collect and be withdrawn through a slag tap hole in the side of the furnace whenever desired. The edges of the floor 8 contact sufficiently closely with the sides of the furnace walls to provide tight joints to prevent escape of molten slag.

It is well known that in furnaces of this type, a portion of the slag that is formed from the incoming fuel collects in a molten condition upon the floor of the furnace and a portion of the dust from the fuel passes out through the stack into the atmosphere and settles upon the surrounding territory, causing complaints.

With this invention, dust is caught before it reaches the outside atmosphere and is returned to the furnace. A dust catcher 10 of the well known type is somewhat diagrammatically indicated in the drawings for catching the dust on the way from the furnace before it reaches the stack 11. This dust catcher 10 may be of the well known cyclone type having a conically shaped bottom with the valve or gate 12 therein. A pipe 13 leads from the bottom of the dust catcher 10 to a nozzle 14 that extends through a side wall of the furnace, preferably near the bottom thereof. A valve 15 is provided a short distance above the nozzle 14 and a poke hole 16 is provided at the end of the nozzle 14, so that a rod or the like can be inserted for breaking a sheet of slag that may form at the furnace end of the nozzle 14, because of slag forming along the upper portions of the furnace wall and trickling downwardly over the inner end of the nozzle 14.

The dust from the furnace is permitted to collect in the dust catcher 10 until a considerable amount of dust has accumulated and the valves 12 and 15 are then opened to permit the dust to flow into the furnace by gravity and form a pile or layer, as indicated by the reference character 17. The dust usually contains some combustible material which is ignited when it returns to the floor of the furnace, thus developing some heat. The intense heat in the furnace causes the particles of dust to be melted and run together so that it can be permitted to run out of the slag tap hole in the furnace wall. It has been found that a large batch of the dust will become melted in a few hours in operating large size boilers. The dust is melted without an appreciable amount of it becoming again picked up by the combustion air. The melting of the dust takes place from the upper surface thereof, the slag forming and trickling down over the surface of the pile of dust as the carbon is burned out and the remaining material becomes fused.

In the modification shown in Figs. 2 and 3, a furnace of a different type is illustrated. In this modification, a plurality of flues 20 are shown above the boiler in which flues the usual economizers and air heaters may be located. The flue dust collects in the hoppers 21 at the lower ends of the flues 20 and is carried by means of screw conveyors 23 to the flue dust storage bin 24. A feeder 25 of a well known sort is located at the bottom of the bin 24 and by means of this feeder, the flue dust that is stored in the bin 24 is fed through the pipe 26 into the furnace in the manner and for the purpose above described in connection with Fig. 1.

The furnace shown in Figs. 2 and 3 is provided on opposite sides with fuel burners 27 and the walls of this furnace are shown with cooling tubes 28. The inclined tubes 29 of the boilers above the furnace are connected to the steam and water drums 30 in the usual way.

The draft or suction will usually be higher at the flue dust hoppers 21 than the draft or suction in the lower portion of the furnace where the pipe 26 enters the furnace. The feeder 25 acts as an air or gas seal to prevent the passage of gas upwardly through the pipe 26 into the storage bin 24, which storage bin will be under substantially the same suction or draft as that in the hoppers 21 and flues 20.

With this invention, the nuisance of the dust settling from the stack is not only avoided, but the fuel in the dust is saved. Also, the trouble and expense of hauling away the fine dust, in installations where dust catchers have been used heretofore, is avoided as the molten dust is mixed with the slag which usually collects at the bottom of the furnace and can be disposed of in the same way as the slag as it runs off in a molten condition.

We claim:

1. The process of disposing of flue dust from a furnace which comprises separating the dust from the products of combustion, returning the dust to the furnace, melting the incombustible portion thereof by the heat of the furnace and withdrawing the molten product from the furnace.

2. The process of disposing of flue dust from a furnace which comprises separating the dust from the products of combustion, returning the dust intermittently in piles to the floor of the furnace, melting the incombustible portion thereof by the heat of the furnace and withdrawing the molten product from the furnace.

3. The method of furnace operation which comprises burning fuel containing incombustible material under conditions causing the ash to become molten, separating flue dust containing both combustible and incombustible material from the products of combustion, returning the dust to the furnace and melting the incombustible material while burning the combustible material, mingling the molten material from both sources and causing it to flow from the furnace.

4. The process which comprises water cooling furnace walls, disposing of flue dust which contains combustible material from said furnace by separating the dust from products of combustion and returning said dust to the furnace before the combustible material in said dust is burned, melting the incombustible portion thereof by the heat of the furnace and withdrawing the molten product from the furnace.

5. The process which comprises burning fuel in suspension in a furnace, collecting a pool of molten slag from said fuel in the bottom of said furnace, separating dust which contains combustible material from the products of combustion from said furnace and returning it to said pool of molten slag before the combustible material in said dust is burned.

6. The process which comprises burning fuel in suspension in a furnace, collecting a pool of molten slag from said fuel in the bottom of said furnace, separating dust which contains combustible material from the products of combustion from said furnace and returning it to said pool of molten slag at a point near the upper surface of said pool before the combustible material in said dust is burned.

7. In a furnace, the combination of means defining a combustion chamber for the burning of pulverized fuel in suspension and including a furnace bottom constructed to sustain ash or slag in molten form, means for burning fuel in said chamber in such a manner as to provide for the maintenance of a molten ash or slag pool over at least a part of the furnace bottom, means disposed at points remote from the combustion chamber for separating dust out of the stream of gaseous products of combustion flowing from the combustion chamber, conduit means for returning and depositing such dust on the furnace bottom and means providing for the removal of molten slag from the bottom of the furnace.

8. In a furnace, the combination of means defining a combustion chamber for the burning of pulverized fuel in suspension and including a furnace bottom constructed to sustain ash or slag in molten form, means for burning fuel in said chamber in such a manner as to provide for the maintenance of a molten ash or slag pool over at least a part of the furnace bottom, means disposed at points remote from the combustion chamber for separating dust out of the stream of gaseous products of combustion flowing from the combustion chamber, conduit means for returning the dust separated out of the stream to the combustion chamber and for depositing and accumulating such dust at a place in the combustion chamber where the dust is subjected to the heat of the burning fuel and from where the molten residue of the dust may flow into and mingle with the molten slag in the pool, and means providing for the removal of molten slag from the pool.

ERVIN G. BAILEY.
RALPH M. HARDGROVE.